Patented May 23, 1933

1,910,169

UNITED STATES PATENT OFFICE

OSCAR KASELITZ, OF BERLIN, GERMANY

RECOVERY OF MAGNESIA FROM MINERALS

No Drawing. Application filed June 17, 1929, Serial No. 371,720, and in Germany January 12, 1929.

My invention refers to the recovery of magnesium oxide from minerals, such as kieserite, or from other magnesium salts and more particularly to the precipitation of magnesium hydroxide, which is then converted into the oxide in a well known manner. I have found that the products obtained in this manner are distinguished from similar products produced in a different manner by their considerably greater purity.

I am aware that it is old to treat watery solutions of magnesium salts with ammonia in order to produce magnesia, and that magnesium sulfate has been used for this purpose, which, when treated with ammonia, yields a solution of ammonium sulfate as a by-product. The kieserite serving as starting material is first dissolved by prolonged boiling; from the solution the magnesium sulfate separates out by crystallization.

According to the present invention the kieserite is converted directly into magnesium hydroxide. I have found that concentrated ammonia solutions i. e. solutions substantially saturated with ammonia gas are capable of decomposing kieserite in a comparatively short time, without any heat being applied from the outside, into solutions of magnesium hydroxide and ammonium sulfate. The hydroxide has however admixed to it some anhydrite (i. e. anhydrous calcium sulfate) which is not changed by the ammonia and renders the hydroxide unfit for many uses. According to my invention, I separate the two components of this mixture by elutriating with the decomposing liquor, whereby a magnesium hydroxide of high purity is obtained, while ammonium sulfate can be recovered from the solution.

The same decomposition and the same elutriating operation, which is based on the comparatively slow settling velocity of the light and flocculent magnesium hydroxide and on the high settling velocity of the heavy anhydrite powder, can be applied also to other natural mineral salts containing magnesium. In all cases solutions containing, besides the other components of the mineral, ammonium salts instead of the magnesium salts, are obtained, the magnesium hydroxide being separated from the insoluble and indecomposable components (mostly anhydrite) by elutriating with the solution itself. The same applies to mixtures of kieserite and other salts. Thus natural kainite or a mixture of kieserite and potassium chloride having the same composition may be treated similarly and with the same effect.

As is well known, ammonia will also precipitate from their solutions a number of salts, such as the alkali sulfates. Therefore, if a solution of potassium sulfate or one containing the ions K and $SO_4$ is substantially saturated with ammonia introduced in a gaseous form, potassium sulfate is quantitatively precipitated. Similarly, if a magnesium salt is present in the starting material and the mass is elutriated with the decomposition liquid, the potassium sulfate, which is also a heavy precipitate, is obtained together with that part of the raw material which is not decomposed by ammonia, while the liquid, which contains the other salts, carries away the magnesium hydroxide.

Instead of water I may also employ solutions saturated with the salts to be recovered. In this case the solution will have, at the end of the operation, the same composition as before, while all newly formed salts, being unfit to be elutriated, are recovered together with the anhydrite, the magnesium hydroxide being removed by elutriating. This involves the particular advantage, that the solutions can always be put to renewed use without any further treatment such as the expulsion of ammonia or evaporation. Furthermore the solutions treated with ammonia always contain some dissolved magnesium salts. If the same mother liquor is always re-used, the new mother liquor will also contain the same quantities of magnesium salts, and the fresh magnesium salts under treatment are converted into corresponding quantities of ammonium salts, while, when non-saturated solutions are evaporated, the quantity of non-decomposed magnesium salt always increases and is undesirably present in the crystallized mass obtained. Thus for instance a solution of ammonium sulfate, which is always re-used for the treatment of kieserite with ammonia, will furnish exclusively pure ammonium sulfate containing no $MgSO_4$ besides the magnesium hydroxide obtained by elutriating.

The same elutriating process can also be applied to artificial salt mixtures, for instance the potassium-magnesia of commerce. This mixture, if treated with a solution saturated with ammonium sulfate and potassium sulfate, on being saturated with ammonia, furnishes, besides the magnesium hydroxide separated by elutriating, an equimolecular mixture of ammonium sulfate and potassium sulfate, which may be used for fertilizing purposes.

Various changes may be made in the details disclosed in the foregoing specification without departing from the invention or sacrificing the advantages thereof.

In the claims affixed to this specification no selection of any particular modification of the invention is intended to the exclusion of other modifications thereof and the right to subsequently make claim to any modification not covered by these claims is expressly reserved.

I claim:—

1. The method of recovering magnesium hydroxide from a salt mixture containing a magnesium salt, comprising substantially saturating such mixture in the presence of water with ammonia gas to effect decomposition of the mixture and separating the magnesium hydroxide, which is precipitated thereby, from non-decomposed constituents by elutriating with the decomposition liquor.

2. The method of recovering magnesium hydroxide from a salt mixture containing a magnesium salt, comprising substantially saturating such mixture in the presence of a saturated salt solution with ammonia gas to effect decomposition of the mixture and separating the magnesium hydroxide, which is precipitated thereby, from non-decomposed constituents by elutriating with the decomposition liquor.

3. The method of recovering magnesium hydroxide from kieserite comprising substantially saturating such mixture in the presence of water with ammonia gas to effect decomposition of the mixture and separating the magnesium hydroxide, which is precipitated thereby, from non-decomposed constituents by elutriating with the decomposition liquor.

4. The method of recovering magnesium hydroxide from kiesertie comprising substantially saturating such mixture in the presence of a saturated salt solution with ammonia gas to effect decomposition of the mixture and separating the magnesium hydroxide, which is precipitated thereby, from non-decomposed constituents by elutriating with the decomposition liquor.

In testimony whereof I affix my signature.

OSCAR KASELITZ.